Figure 1:
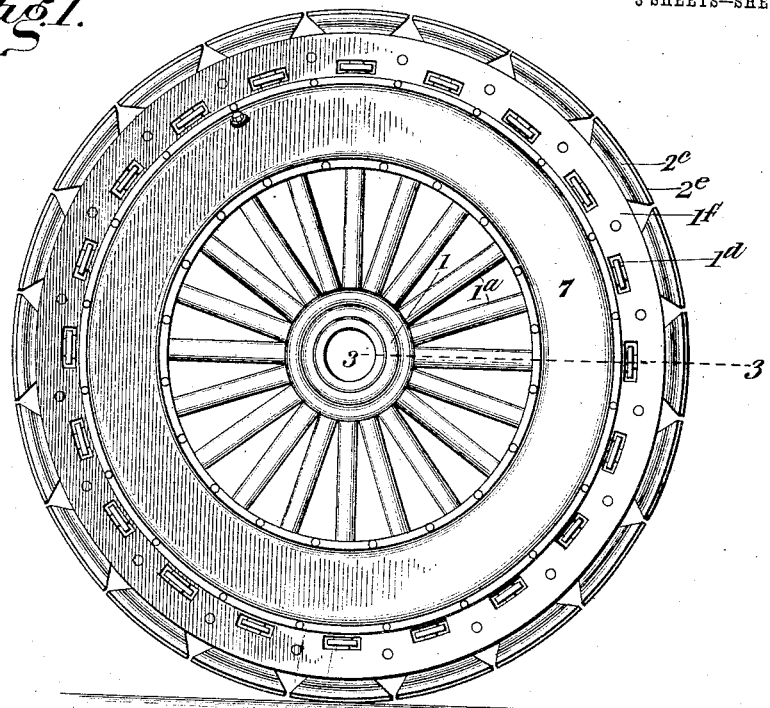

No. 866,540. PATENTED SEPT. 17, 1907.
H. VILLIERS-STUART.
VEHICLE WHEEL.
APPLICATION FILED DEC. 10, 1906.

3 SHEETS—SHEET 1.

WITNESSES

INVENTOR:
Horace Villiers-Stuart
By Alexander Howell
Attorneys

No. 866,540.  
PATENTED SEPT. 17, 1907.
H. VILLIERS-STUART.  
VEHICLE WHEEL.  
APPLICATION FILED DEC. 10, 1906.
3 SHEETS—SHEET 2.
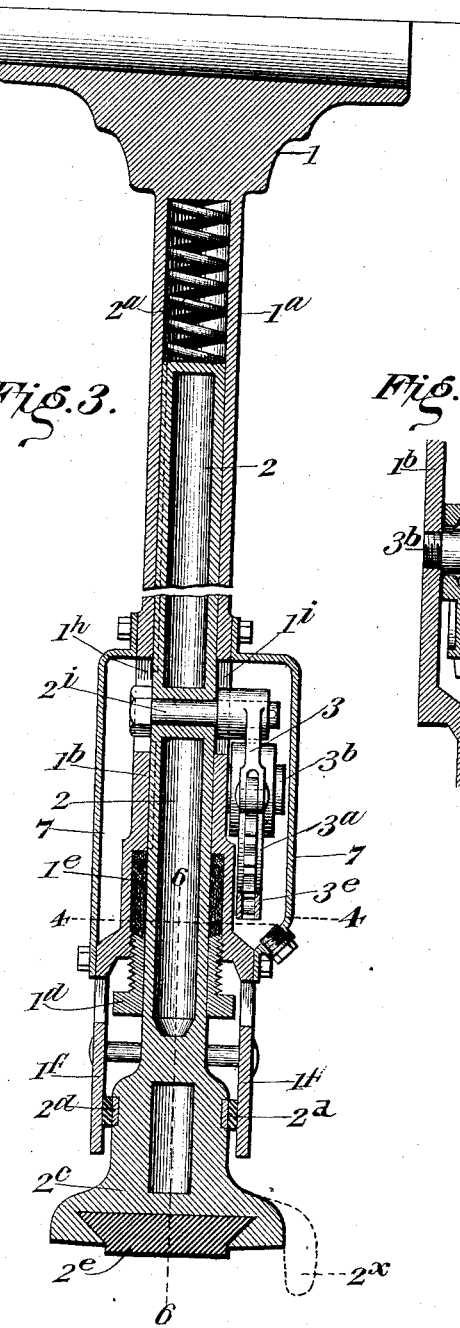
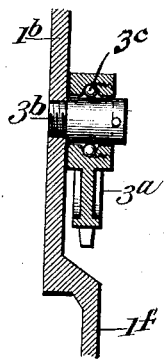
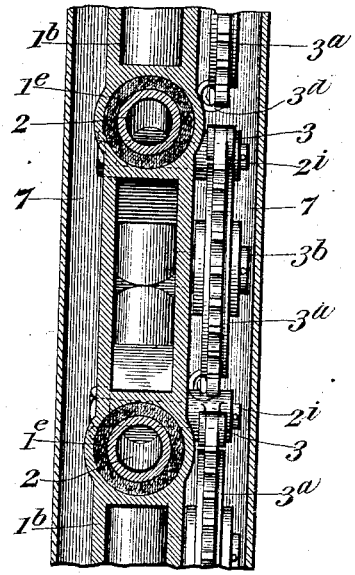
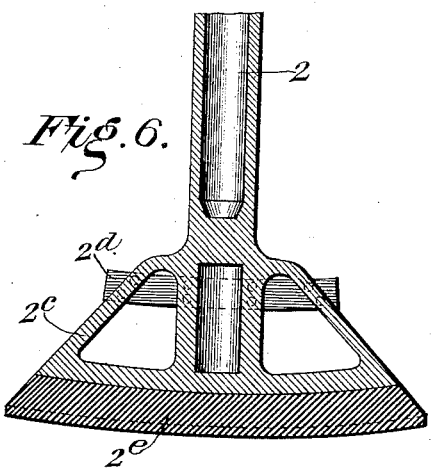
WITNESSES  
INVENTOR:  
Horace Villiers-Stuart  
By Alexander & Dowell  
Attorneys

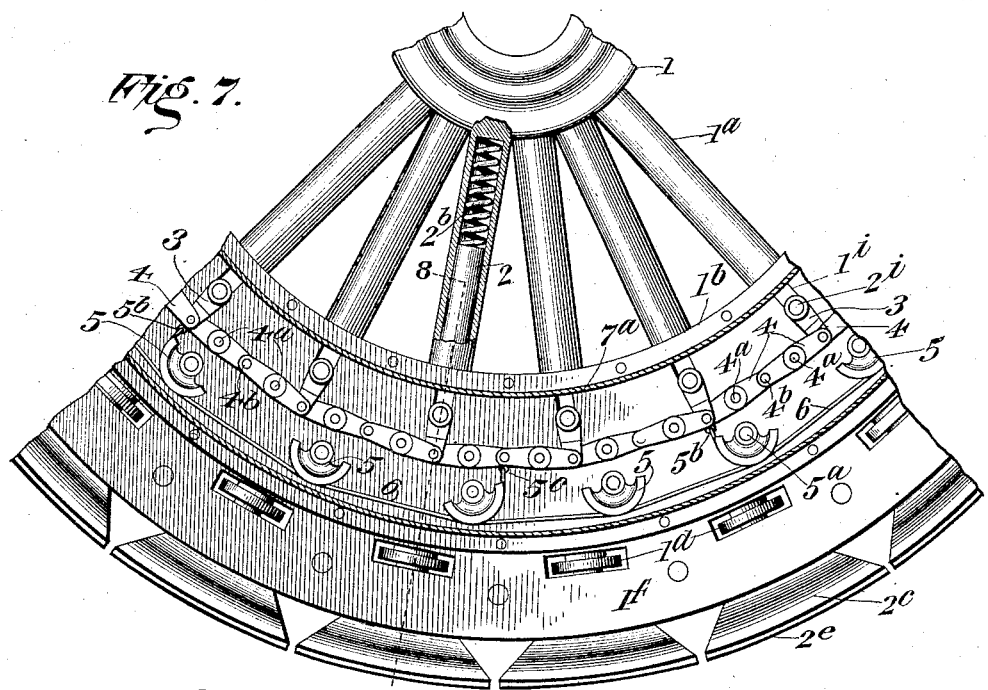
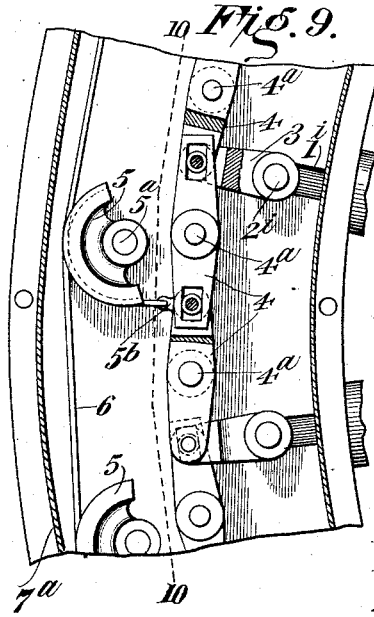
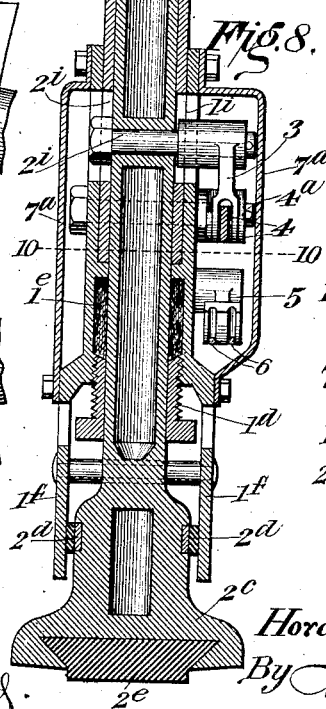
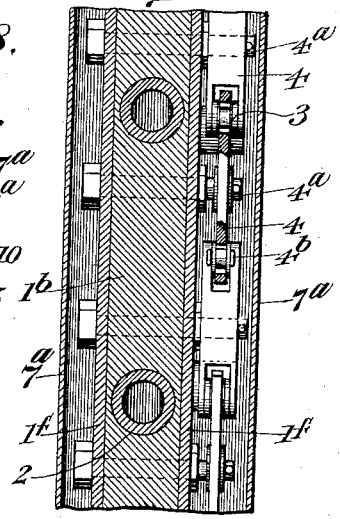

UNITED STATES PATENT OFFICE.

HORACE VILLIERS-STUART, OF LOUISVILLE, KENTUCKY.

VEHICLE-WHEEL.

No. 866,540.      Specification of Letters Patent.      Patented Sept. 17, 1907.

Application filed December 10, 1906. Serial No. 347,147.

*To all whom it may concern:*

Be it known that I, HORACE VILLIERS-STUART, a subject of the King of Great Britain, of Louisville, in the county of Jefferson and State of Kentucky, have invented certain new and useful Improvements in Vehicle-Wheels; and I hereby declare that the following is a full, clear, and exact description thereof, reference being had to the accompanying drawings, which form part of this specification.

This invention is an improvement in vehicle wheels, and is especially adapted for wheels used on automobiles, and other heavy self-propelled vehicles, but can be usefully applied to carrying wheels of all sorts of vehicles where a cushion-tired wheel is desired.

The object of the invention is to provide a wheel possessing the resiliency and flexibility of a cushioned or pneumatic tired wheel, without employing pneumatic or cushioned tires; but instead the wheel is provided with a series of radially yielding tire segments which may be hard surfaced so as to wear indefinitely, and yet are so connected with and attached to the body of the wheel that they can move on radial lines, so that the portion of the tread of the wheel to which pressure is applied can yield, the amount of yielding depending upon the resilient cushioning effect of springs or equivalent devices by which each tire segment is held normally in outermost position; but in my present wheel I not only provide each tire segment with its individual cushioning device, but I so construct the wheel that each tire segment is additionally cushioned and controlled by the cushioning device of every other segment in the wheel, so that while the individual tire cushioning devices may be comparatively weak, their sum total is great, and sufficient to enable the wheel to stand the shocks and pressures incident to usage without injury, and without unduly displacing the particular tire-segment to which pressure is applied; furthermore by my novel construction all the tire-segments are caused to practically move inwardly or outwardly in unison,—that is, if the tire-segment to which pressure is applied yields, the others must correspondingly yield. Again I utilize the centrifugal action of the tire-segments to reinforce or augment the cushioning devices when the vehicle is moving, for the rotative movement of the wheel tends to throw the tire-segments away from the center, and the total amount of such centrifugal force is used to assist the cushioning devices in resisting the inward yielding movement of any tire-section to which pressure is applied.

In the accompanying drawings I have shown wheels embodying the invention, and will describe the same with reference to the drawings, remarking that the invention is not restricted to the specific structures shown, but is well defined in the claims appended to the description.

Figure 2:
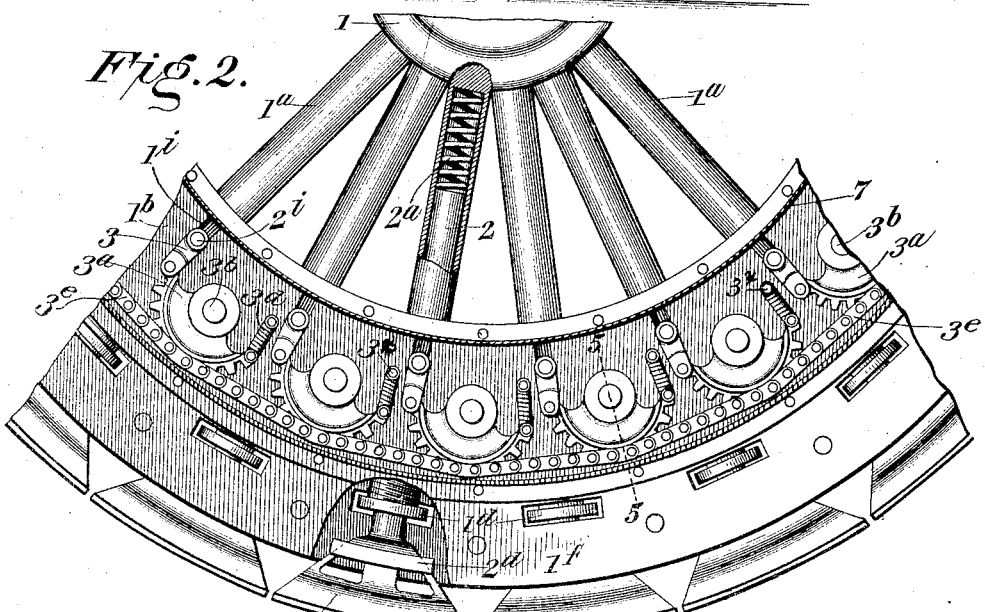

In the drawings—Figure 1 is a side elevation of a complete wheel embodying the invention and showing the present preferred form thereof. Fig. 2 is an enlarged view of part of such wheel with the outer covers partly broken away to show the interior parts. Fig. 3 is an enlarged sectional view on line 3—3, Fig. 1. Fig. 4 is a section on line 4—4, Fig. 3. Fig. 5 is a section on line 5—5, Fig. 2. Fig. 6 is an enlarged sectional view of one of the tire-segments on line 6—6, Fig. 3. Fig. 7 is a view similar to Fig. 2, showing a modified construction. Fig. 8 is a section on line 8—8, Fig. 7. Fig. 9 is an enlarged detail view of the compensating levers and constructions. Fig. 10 is a section on line 10—10, Fig. 8, looking upwardly.

The wheel has a hub 1 of any suitable construction, from which radiate tubular spokes $1^a$ preferably of metal, and twenty in number, although I do not restrict myself to such number of spokes. These spokes are fixedly attached at their outer ends to an annular hollow rim $1^b$, having openings in its outer periphery opposite the ends of the spokes $1^a$, through which openings extend the sliding spoke members 2 which telescope into the spokes $1^a$, as shown. Suitable cushioning devices, such as helical springs $2^a$, are interposed between the inner ends of spoke-members 2 and the hub 1, as shown in Figs. 2 and 3, such cushioning devices being concealed in and protected by the hollow spokes $1^a$. The spoke-members have a close sliding fit in the spokes, and they pass through stuffing boxes $1^c$ in the hollow rim $1^b$, and through glands $1^b$ closing the stuffing boxes and surrounding the spoke-members, as in ordinary stuffing construction.

To the outer end of each spoke-member is connected a tire-segment $2^c$ which may be formed of metal, and the outer surfaces of such segments are curved on arcs conforming to the largest circumference of the wheel, the segments corresponding in number with the spokes, and being of such length that they together form practically a continuous tire, the segments being separated only sufficiently to allow their proper radial movement. The segments and spoke-members may be kept from rotating or turning in the spokes and rim by any suitable means; as shown the tire-segments have side rubbing plates $2^d$ which contact with annular side plates $1^f$ which are connected with the rim $1^b$ and inclose the stuffing-box glands, and the projecting ends of the spoke-members, but permit the tire-segments to move inwardly and outwardly, or radially to the wheel. The tire-segments $2^c$ may be faced with wear-plates $2^e$ of steel, rubber, raw-hide or other desired material according to the intended usage of the wheel. If intended to be used for tram or railroad cars, the tire-segments could be flanged, as indicated in dotted lines at $2^x$ in Fig. 3. Thus far it will be seen each tire-segment has its individual spoke-member to support it, and an individual cushioning device to resist its inward movement.

Each spoke-member 2 is provided with a pin or bolt

2ⁱ which projects through slots 1ʰ, 1ⁱ, in the side walls of the rim 1ᵇ, and a link 3 is hung on one projecting end of such bolt, said link extending outwardly, and is pivotally connected to one side of a rocking sector 3ª which is pivoted at its axis on a stud 3ᵇ attached to the adjacent side wall of rim 1ᵇ, as shown in Figs. 2 and 5. If desired the sectors could be mounted on the pins 3ᵇ by ball-bearings, as indicated at 3ᶜ in Fig. 5. The sectors are arranged between the spoke-members, as shown in Fig. 2, and the end of each sector opposite the link 3, is preferably connected to one end of a short stout helical spring 3ᵈ, the other end of which is attached to the wall of rim 1ᵇ as shown at 3×, Fig. 2. Thus springs 3ᵈ supplement and assist springs 2ª. Preferably the several sectors 3ª are peripherally connected by suitable flexible means, so that when one is moved the others will be correspondingly affected; a band or wire is shown in Fig. 7, and in Figs. 2 to 4, I show a sprocket-chain 3ᵉ which I now think preferable, and for this purpose the sectors 3ª in Figs. 2—4 are shown as toothed, so as to engage the sprocket-chain 3ᵉ. The connection should be such that when one sector 3ª is rocked the others will be correspondingly rocked. Obviously if this be the case, when any one tire-segment is pressed inward, its connected sector is rocked, and as the other sectors are similarly rocked, every tire-segment in the wheel will be correspondingly moved inward; therefore every cushioning device in the wheel will contribute to resist the displacement of any of the tire-segments and to return such segment to its outermost position if displaced. In this construction the cushioning devices may be much lighter and stronger than would be required if each had to be able to bear the strain alone,—again the wheel will be kept symmetrical at all times, for its periphery expands or contracts substantially uniformly; and also every sector spring contributes toward the cushioning of the tire as a whole.

In the modification shown in Figs. 7 to 10, all the described advantages are obtained, but instead of connecting the spoke-members directly to the sectors, the links 3 are pivotally connected to the adjacent ends of oscillating levers 4, which are pivoted on the side wall of the rim 1ᵇ as at 4ª, the ends of adjacent levers 4 between the links 3 being pivotally connected, as at 4ᵇ, so that when one set of levers is rocked by the inward movement of the spoke-members connected therewith, all the other spoke-members will be similarly moved, and thus the same effect obtained as is effected by the sectors 3ª and chain 3ᵉ. In addition sectors 5 may be provided which are pivoted on the wall of rim 1ᵇ as shown at 5ª. These sectors may be connected with the adjacent links if desired, as in Fig. 2; but when the levers 4 are used, it is not necessary to connect each sector 5 directly to the spoke-members. Instead every fourth sector may be connected to the adjacent link 3, as indicated at 5ᵇ in Fig. 7, and the second intermediate sector may be connected to the pivot connection of the adjacent levers 4, as indicated at 5ᶜ Fig. 7. Instead of a sprocket-chain wire cables 6 might be employed, connecting the several sectors, so that all will move alike. The first and third intermediate sectors 5, not directly connected with either chain or links may be employed simply as idlers to guide the cables 6.

In addition to the springs and cushioning devices, centrifugal force is also utilized in resisting the pressure on any tire-segment, by reason of the described connections between the several spoke-sections. Thus as the wheel rotates the sections naturally tend to fly outward, this tendency increasing in power as the speed of the wheel increases, and when any tire-segment is pushed inward such movement is resisted by the combined centrifugal motion of every other free tire-segment and spoke-member.

The sectors and chain may be housed by means of annular plates 7, 7ª, bolted to the outer sides of rim 1ᵇ as shown in the drawings. And the chamber thus formed may be filled with oil so as to keep all the moving parts thoroughly lubricated and exclude dust therefrom; the stuffing-boxes prevent waste of the oil without hindering the radial movements of the spoke-members and tire-segments.

The invention provides a yielding cushioned wheel with hard treads not liable to be punctured or burst; enables larger wheels to be used for motor cars, thus insuring an easier motion to the car; increases the cushioning effect on the tire-segments; makes each tire-segment reinforce the other; and utilizes centrifugal force to maintain the elasticity of the rim.

Having described my invention what I claim as new and desire to secure by Letters Patent is:—

1. In a wheel, the combination of radially movable tire-segments, connections whereby the radial displacement of one segment is similarly transmitted to all of the other segments, and cushioning devices for automatically returning the segments to normal position.

2. In a wheel, the combination of radially movable spoke-members, tire-segments attached to and movable with said spoke-members, connections whereby the radial displacement of one spoke-member is similarly transmitted to all of the other spoke-members, and cushioning devices for automatically returning the spoke-members to normal position.

3. In a wheel, the combination of radially movable tire-segments, a cushioning device for each segment, and connections between such segments, whereby the radial displacement of one segment causes a corresponding movement of all of the other segments.

4. In a wheel, the combination of radially movable spoke-members, tire-segments attached to such spoke-members, cushioning devices for each spoke-member, and connections between such members whereby the radial displacement of one spoke-member causes a corresponding displacement of all of the other spoke-members.

5. In a wheel, the combination of tubular spokes, radially movable spoke-members fitted therein, cushioning devices for such spoke-members, tire-segments on the outer ends of said spoke-members, and equalizing connections between the several spoke-members whereby the radial displacement of one spoke member similarly affects all the other spoke members.

6. In a wheel, the combination of radially movable tire-segments, a series of pivoted sectors, and connections between the sectors, and tire-segments whereby the movement of one tire-segment similarly moves all the others.

7. In a wheel, the combination of radially movable spoke-members, tire-segments connected thereto, a series of pivoted sectors, and connections between the sectors and spoke-members whereby the movement of one tire-segment similarly moves all the others.

8. In a wheel, the combination of a rim, radially movable tire-segments, sectors pivoted on the rim adjacent to the segments, links pivotally connecting the spoke-members to the sectors, and a flexible connection between the sectors.

9. In a wheel, the combination of a rim, radially movable spoke-members projecting through the rim, cushioning devices for such members, tire-segments attached to the outer ends of the spoke-members, sectors pivoted on the rim, connections between the sectors and spoke-members, and connections between the sectors, substantially as described.

10. In a wheel, the combination of a rim, radially movable spoke-members, tire-segments, sectors pivoted on the rim adjacent to the spoke-members, links pivotally connecting the spoke-members to the sectors, and a flexible connection between the sectors.

11. In a wheel, the combination of tubular spokes, a rim connected therewith, spoke-members telescoped with the spokes, cushioning devices for such members, tire-segments attached to the outer ends of such spoke-members, sectors pivoted on the rim, connections between the sectors and spoke-members, and flexible connections between the sectors, substantially as described.

12. In a wheel, the combination of a hub, spokes, and a rim connected to the spokes, tire-segments projecting beyond the rim and movable radially thereof; sectors pivoted on the rim, link connections between the sectors and tire-segments, and flexible connections between the segments whereby the radial movement of one tire-segment is imparted correspondingly to the other segments.

13. In a wheel, the combination of a hub, radial spokes, and a rim connected to the spokes, spoke-members projecting beyond the rim and movable radially thereto, and tire-segments on the outer ends of the spoke-members; with sectors pivoted on the rim, link connections between the sectors and spoke-members, and flexible connections between the sectors, whereby the radial movement of one tire-segment is imparted correspondingly to the other segments.

14. In a wheel, the combination of a hub, radial spokes, and a rim connected to the spokes, spoke-members telescoping with the spokes and projecting through the rim, tire-segments attached to the outer ends of the spoke-members, sectors pivoted on the rim adjacent to the spoke-members, links connecting the sectors with the spoke-members, and flexible connections between the sectors, whereby the radial movement of one segment is transmitted to each of the others, substantially as described.

15. In a wheel, the combination of a hub, radial tubular spokes, and a hollow rim connected to the spokes, spoke-members telescoping with the spokes and projecting through the rim, tire-segments attached to the outer ends of the spoke-members; sectors pivoted on the rim adjacent to the spoke-members, links connecting the sectors with the spoke-members, and a chain connecting the several sectors, whereby the radial movement of one segment is transmitted to each of the others.

16. In a wheel, the combination of a hub, spokes and rim, radially movable spoke-members connected to the rim, cushioning devices for each spoke-member, radially movable tire-segments connected to the outer ends of each spoke-member, sectors pivoted to the rim, links connecting the spoke-members to the adjacent sectors, springs connecting the other ends of the sectors to the rim, and a flexible connection between the several sectors.

17. In a wheel, the combination of a rim, radially movable spoke-members projecting through the rim, cushioning devices for such members, tire-segments attached to the outer ends of the spoke-members, sectors pivoted on the rim, connections between the sectors and spoke-members, and connections between the sectors,—with a housing attached to the rim and inclosing the sectors and their connections, and side plates attached to the rim on opposite sides of the tire-segments.

18. In a wheel, the combination of a hub, spokes and rim, radially movable spoke-members telescoping with the spokes and passing through the rim, tire-segments on the outer ends of the spoke-members, rocking sectors pivoted on the rim, links pivotally connecting the sectors with the adjacent spoke-members, a flexible connection between the several sectors, and side plates attached to the rim and partly inclosing the tire-segments.

19. In a wheel, the combination of a hub, spokes and rim, radially movable spoke-members connected to the rim, cushioning devices for each spoke-member, radially movable tire-segments connected to the outer ends of the spoke-members, sectors pivoted to the rim, links connecting the spoke-members to the adjacent sectors, springs connecting the other ends of the sectors to the rim, and a flexible connection between the several sectors; with a housing attached to the rim and inclosing the sectors and their connections, and forming an oil-chamber, and side-plates attached to the rim on opposite sides of the tire-segments.

20. In a wheel, the combination of a hub, spokes and hollow rim, radially movable spoke-members telescoping with the spokes and passing through the rim, tire-segments on the outer ends of the spoke-members, stuffing-boxes attached to the rim and through which the spoke-members pass, rocking sectors pivoted on the rim, links connecting the sectors with the adjacent spoke-members, a flexible connection between the several sectors; a housing attached to the rim and inclosing the sectors and their connections, and forming an oil-chamber, and side-plates attached to the rim and partly inclosing the tire-segments.

In testimony that I claim the foregoing as my own, I affix my signature in presence of two witnesses.

HORACE VILLIERS-STUART.

Witnesses:
E. G. WALKER,
T. C. GAINES.